United States Patent [19]

Golze

[11] 4,339,223
[45] Jul. 13, 1982

[54] ROOF TOP CARRIER

[76] Inventor: Richard R. Golze, 637 Kingsley Trail, Bloomfield Hills, Mich. 48013

[21] Appl. No.: 169,613

[22] Filed: Jul. 17, 1980

Related U.S. Application Data

[63] Continuation-in-part of Ser. No. 926,940, Jul. 21, 1978, Pat. No. 4,260,314.

[51] Int. Cl.³ .............................................. B60R 9/04
[52] U.S. Cl. .................................. 414/462; 180/271; 224/310; 308/3.8
[58] Field of Search ............... 414/462, 541, 544, 630, 414/631; 224/42.44, 309, 310; 180/271; 308/3.6, 3.8, 3.9

[56] References Cited

U.S. PATENT DOCUMENTS

| | | | |
|---|---|---|---|
| 2,728,626 | 12/1955 | Gussack | 308/3.8 X |
| 3,193,124 | 7/1965 | Essling | 414/462 |
| 3,282,455 | 11/1966 | Demarais | 414/462 |
| 3,572,305 | 3/1971 | Moragne | 180/271 |
| 3,715,046 | 2/1973 | Marklund | 414/631 X |
| 3,809,425 | 5/1974 | Blaschke | 224/310 X |
| 4,260,314 | 4/1981 | Golze | 414/462 |

Primary Examiner—Leslie J. Paperner

[57] ABSTRACT

A car top carrier is capable of both horizontal and vertical movement. The carrier has two telescoping tracks for horizontal movement. When the tracks are fully extended a finger in each track mechanically locks into place, thereby preventing any further horizontal movement. The carrier is vertically slidable by pulling a spring loaded plunger. Gravity allows the carrier to descend so that the load can be removed. The vertical descent is controlled by standard pneumatic or hydraulic cylinders. An electrical interlock between the engine ignition and the locked car top carrier prevents the load from sliding off the roof of the car due to centrifugal force.

6 Claims, 7 Drawing Figures

ROOF TOP CARRIER

This is a continuation-in-part of copending application 926,940 filed July 21, 1978, now U.S. Pat. No. 4,260,314.

BACKGROUND OF THE INVENTION

Examples of pertinent patents which were found are:
U.S. Pat. No. 4,039,096
U.S. Pat. No. 3,495,729
U.S. Pat. No. 3,193,124
U.S. Pat. No. 3,452,893
U.S. Pat. No. 2,395,173
U.S. Pat. No. 4,084,736
French Pat. No. 993,581

U.S. Pat. No. 4,039,096 shows a wheel chair storage apparatus. A wheel chair sits on a ramp which is lowered to the ground from a position above the top of the car. The wheel chair is stored in a casing attached to the top of the car roof by a motor which pulls the wheel chair into the casing after it has been raised above the ground.

U.S. Pat. No. 3,495,729 shows a slidable boat loader. A horizontally movable frame pivots to allow the boat to be angularly related to the top of the car roof. Two arms connected to the frame are pivotable so that the boat pivots off the now angled horizontally slidable frame onto the ground for unloading.

U.S. Pat. No. 3,193,124 shows a loading apparatus having horizontally slidable tracks having a horizontal locking device. FIG. 7 shows a spring latch which locks the horizontally slidable frame into place to prevent further horizontal movement. No vertical movement is shown. When the horizontally slidable frame reaches maximum extension a metal finger mechanically locks the horizontally slidable tracks to prevent further horizontal movement and the frame pivots, so that when an end of the frame reaches the ground further pivoting movement is restricted and the load can be removed from the frame.

U.S. Pat. No. 3,452,893 shows a roof rack having horizontally extendable tracks upon which a rollered dolly carries the cargo. The rollered dolly moves along the tracks from a position of the ground adjacent the car to a fixed position on top of the vehicle.

U.S. Pat. No. 2,395,173 shows a loading apparatus having two skid rails hingedly attached to the horizontal roof tracks for permitting the cargo to slide off the roof of the vehicle.

U.S. Pat. No. 4,084,736 shows a motorcycle rack which vertically raises the motorcycle to a fixed and locked position off the ground so that the motorcycle can be transported.

French Pat. No. 993,581 shows a roof rack having pivotable arms.

No patents show the ignition travel lock electrical interlock system which prevents the engine from starting until the travel lock of the roof rack is secured. None of the patents suggests the track locks, the carriage locks and assist rams.

SUMMARY OF THE INVENTION

A car top carrier is capable of both horizontal and vertical movement. The carrier has two telescoping tracks for horizontal movement. When the tracks are fully extended a finger in each track mechanically locks into place, thereby preventing any further horizontal movement. The carrier is vertically slidable by pulling a spring loaded plunger. Gravity allows the carrier to descend so that the load can be removed. The vertical descent is controlled by standard pneumatic or hydraulic cylinders. An electrical interlock between the engine ignition and the locked car top carrier prevents the load from sliding off the roof of the car due to centrifugal force.

The cargo container is locked in position on top of a vehicle. The moveable rack is unlocked from its travel position. Then a sequence of motions deploys the cargo container to the waist-level load/unload position. The rack is pulled in a horizontal plane, to the end of the three segment track. Horizontal motion is accomplished on telescoping track mechanisms of the type as employed in file cabinets. Two improvements have been added to the state-of-the-art file cabinet-type telescoping track. Automatic mechanical locking devices latch into place as each of the two traveling or telescoping rails reach full extension. When the tracks are fully extended and locked, the cargo container is in the fully deployed horizontal position, clear of the side of the vehicle. The cargo container cannot be moved back toward the center of the vehicle without manually unlocking the rails. This is explained in greater detail with reference to the stowing sequence. Stability has been provided to negate the overturning moment of the mass at the end of the cantilever beam by the use of the traveling brace.

Vertical motion is affected, while the horizontal motion is constrained by mechanical locks. To release the container for vertical travel, a spring-loaded plunger is pulled from its locked position. That cannot be accomplished until the horizontal motion is stopped by locking. Pulling the spring-loaded plunger permits the lowering of the cargo container by gravity action. Controlled descent is accomplished through the use of state of the art type pneumatic/hydraulic cylinders as employed on the hatch door of hatchback automobiles.

Vertical displacement is accomplished by the use of two or three-segment telescoping tracks of the same type as employed for horizontal deployment. They differ in that they do not have automatic locks at the end of the travel of each segment. This is unnecessary as gravity urges and maintains the cargo container at its lowermost position. Cargo is loaded or unloaded at convenient waist height.

To return the cargo container to the travel position, it is raised to its elevated position. The spring-loaded plunger automatically enters the lock detent. The cargo container is now held in its uppermost position.

The spring-loaded lock on the outermost telescoping track segment is released. The cargo container is pushed horizontally toward the center of the vehicle, which is the travel-locked position. The cargo container moves on the slideable track until it is fully contained in the second slideable track segment.

Just prior to reaching the limit of its travel, the outermost telescoping track segment automatically cams open the lock on the second or middle telescoping track segment. No action is required by the operator other than urging the cargo container toward travel-locked position.

Continued horizontal movement of the cargo container fully retracts the middle telescoping track segment. When the limit of travel is reached, the spring loaded travel lock engages. The cargo container is now in transport mode.

An electrical interlock between the travel lock and the vehicle engine ignition ensures that the lock must be engaged to permit engine operation. This insures a locked cargo, thereby preventing an unexpected deployment of an unlocked cargo box in a left turn, due to centrifugal action. This safety feature is desireable but not mandatory to the function of this car top carrier.

The cargo container has parallel horizontal telescoping tracks with means to mount the tracks on a roof of a vehicle. Each horizontal track has plural relatively slideable segments. Travel lock means mounted on track segments relatively lock the segments in a telescopically closed position. Extension locking means connected to the segments lock the segments in extended position. A cargo container is mounted on one of the segments for moving from a centered position on a roof of a vehicle, in which the travel locking means is locked, to an extended position at a side of the vehicle, at which extended position extension locking means are locked.

Preferably the travel locking means comprises a travel lock pin extending through aligned openings in the segments. Typically, the travel lock pin comprises a spring loaded travel plunger having means for urging the plunger into the openings in the segments.

A switch means connected to the travel lock means changes state upon engagement of the travel lock means with the openings in the segments. An engine may be started only when both travel locks are engaged.

In a preferred embodiment, the extension lock means is a spring clip connected to one segment and an opening in a second segment for receiving the spring clip. The extension lock also includes a pin extending through plural openings in first and second segments. A spring device, connects to the second segment and mounts the pin. A third segment cams the spring device against spring pressure and withdraws the pin from the first segment. Separation of the third segment from the spring device permits the spring device to move the pin into an opening in the first segment.

A vertical track assembly connects to one of the horizontal track segments. The vertical track assembly has plural vertical track segments. A cargo bin is connected to one of the vertical track segments. A vertical track lock the vertical track segments against relative movement in an upward position of the cargo bin. The vertical track lock is preferably a spring loaded plunger mounted on one vertical track segment for engaging an opening in another vertical track segment. Spring loaded plungers connected between the vertical track segments urge the vertical track segments into an upward telescopically closed position and control descent of the cargo bin when the vertical track lock is unlocked.

Further objects and features of the invention are apparent in the specification which include the above and below specification and claims and the drawings.

BRIEF DESCRIPTION OF THE DRAWINGS

FIG. 1A is a detail of the travel lock.

FIG. 4A and 4B are details of a locking mechanism between first and second horizontal track segments.

DETAILED DESCRIPTION OF THE DRAWINGS

Figure 1:
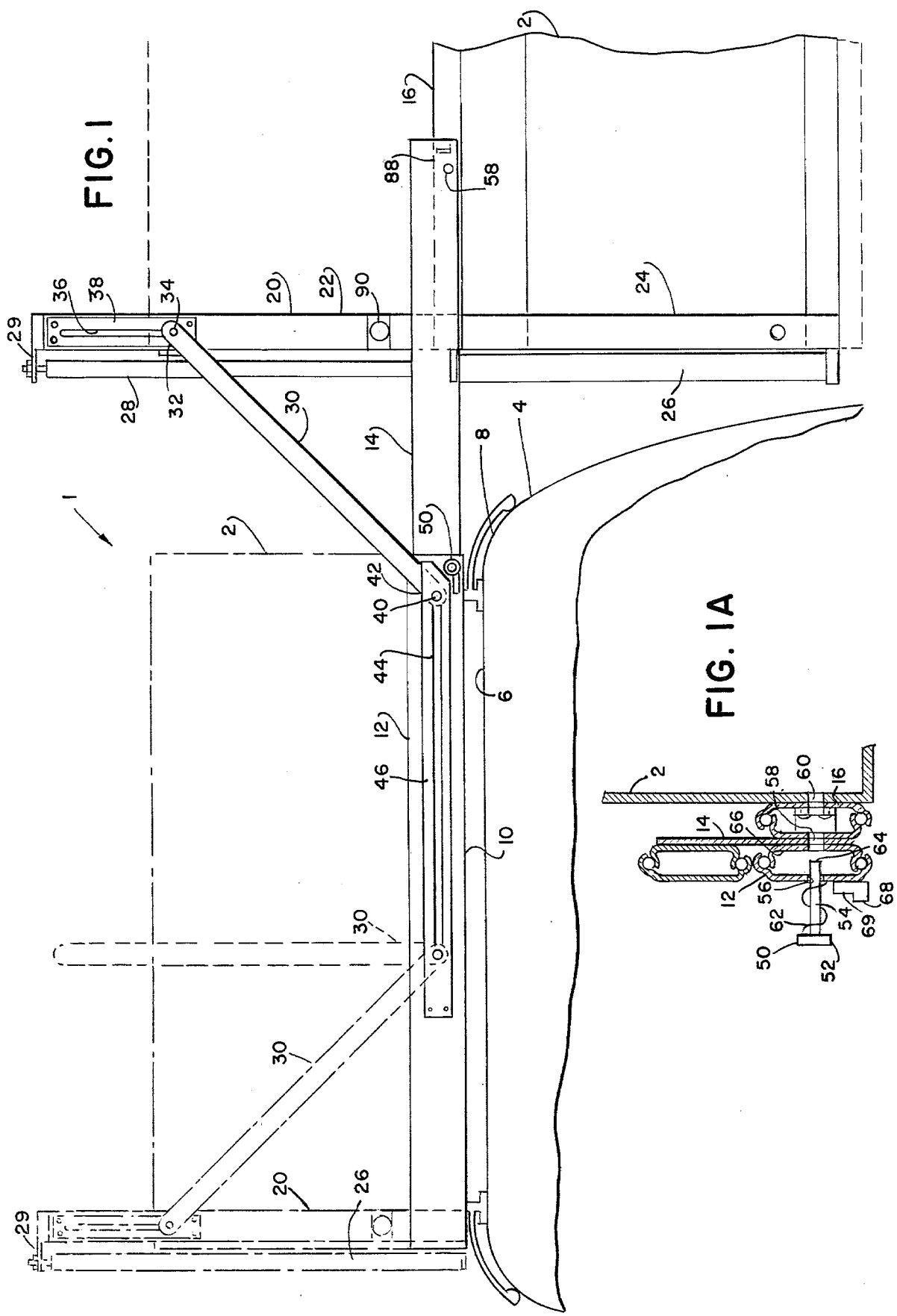
FIG. 1 is a schematic view looking forward from the rear of the vehicle with a cargo carrier deployed on the right hand side of the vehicle.

FIG. 1 shows an end view of a roof top carrier 1 with a cargo carrier 2 in a lower position at the right side of a vehicle.

Figure 2:
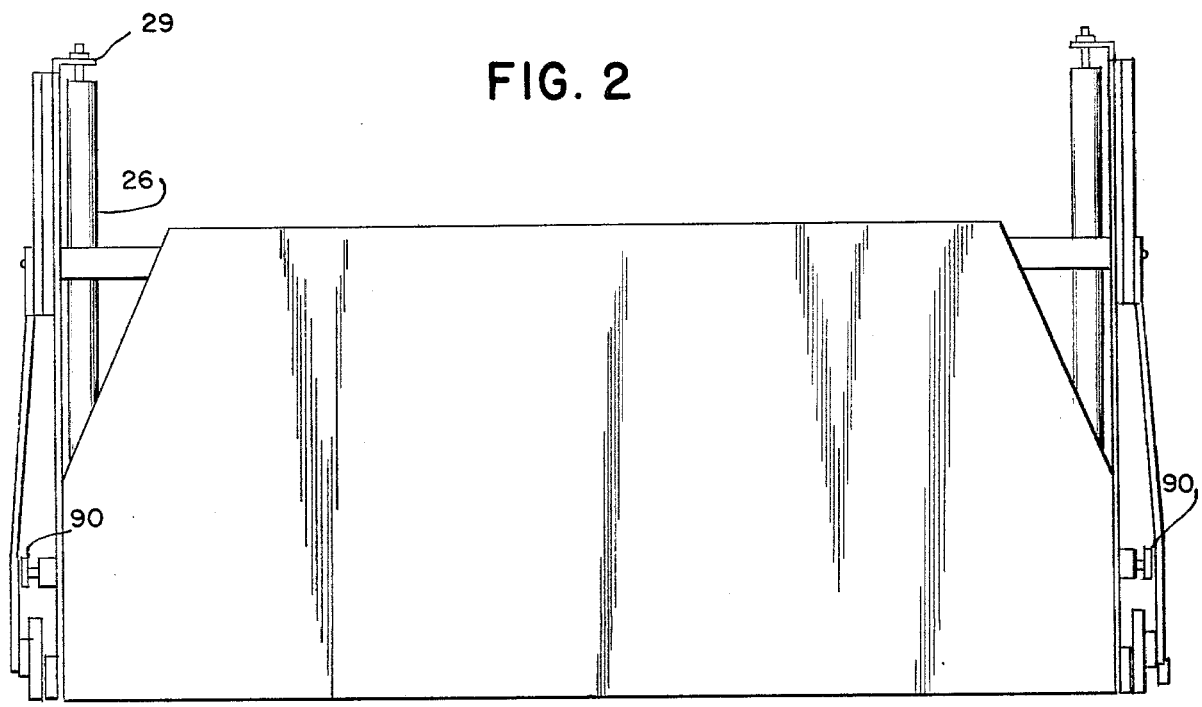
FIG. 2 is a side view of the carrier in elevated position.

FIG. 2 is shown in phantom lines in the raised, stored position. A vehicle 4 has a roof 6 and conventional means 8 to connect the horizontal track 10 to the vehicle above the roof. The horizontal track assembly comprises three segments, a relatively immovable segment 12, a central segment 14 and an end segment 16 which is fixed to a vertical track assembly 20. Track assembly 20 has a first segment 22 which is relatively fixed to third segment 16 of the horizontal track. The vertical assembly has an intermediate segment which does not appear in the drawings and a third segment 24 which appears in the lowered position of FIG. 1. The horizontal and vertical track assemblies are similar to track assemblies in filing cabinet drawers where one track is fixed to a frame, and another track is fixed to a drawer and an intermediate track connects the two tracks via ball bearings which are mounted in cages.

The cargo container or container bin 2 is connected to the third vertical track segment 24 and moves with that vertical track segment. A spring loaded plunger 26 of the type used with hatchback vehicles has a rod 28 which is connected to an extension 29 on the first vertical track member 22. The spring loaded plunger 26 assists in raising the cargo container 2 and controls rate of descent of the cargo carrier.

A brace 30 has an upper end 32 with a pin 34 which slides in slot 36 of guide 38 which is attached to an upper portion of first vertical rack segment 22. A pin 40 at the lower end 42 of guide 30 slides in opening 44 in guide 46 which is connected to the first horizontal track segment 12. As the cargo container 2 and track section 16 are slid to the right to a loading position, the brace 30 slides to the right on pin 40. As pin 40 reaches the right hand end of opening 44, brace 30 rotates clockwise with the pin 34 sliding upward and then downward in opening 36 as the brace rotates. Brace 30 prevents the vertical track 20 from tipping when the cargo carrier 2 is extended to the right. As cargo container 22 and track section 16 are pushed to the left, brace 30 slides to the left on pin 40 until the pin reaches the left end of the groove 44 whereupon the brace turns counterclockwise through the position shown in dash lines to its stored position at the left as shown in phantom lines. The foregoing specific description of the preferred embodiment is similar to the description of the preferred embodiment in current application Ser. No. 926,940 filed July 21, 1978.

To provide ease in handling of the cargo container and to ensure safety during deployment of the cargo container to a side of the vehicle and during lowering and raising of the container and to provide safety during travel of the vehicle, the present invention provides track interlocks. To move the cargo container 2 from the stored position as shown at the left in phantom view, travel lock 50 must first be disengaged. In the embodiment shown in FIGS. 1 and 1A, travel lock 50 is a plunger with a head 52 and a shaft 54 which fits in opening 56 in first horizontal track member 12 and in opening 58 in second horizontal track member 14 and in opening 60 in the third horizontal track member 16.

Spring 62 urges the plunger inward. Once openings 58 and 60 have been misaligned with opening 56, plunger 50 may be released so that the inner tip 64 of the plunger rides upon the uninterrupted surface 66 of the intermediate track member 14. A micro switch 68 has a contactor 69 which contacts the head 52 of the plunger 50 to signal when the travel lock plunger 50 is engaged, which automatically occurs when the tracks are pushed to the left and openings 58 and 60 align with opening 56.

In the preferred form of the invention, parrallel tracks are used. Forward and rearward tracks are identical in mirror symmetry. Travel locks 50 are employed in both the forward and rearward horizontal tracks.

Figure 3:
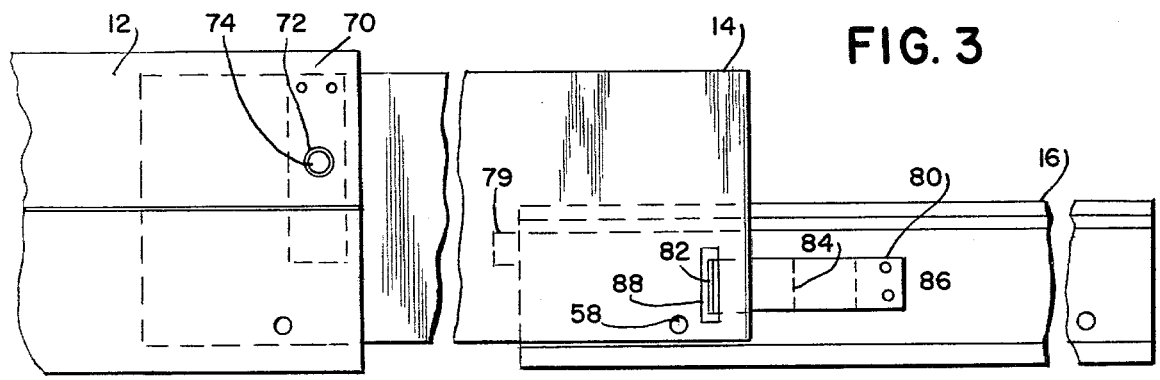
FIG. 3 is a detail of horizontal rails and locks.
Figures 4, 4A:
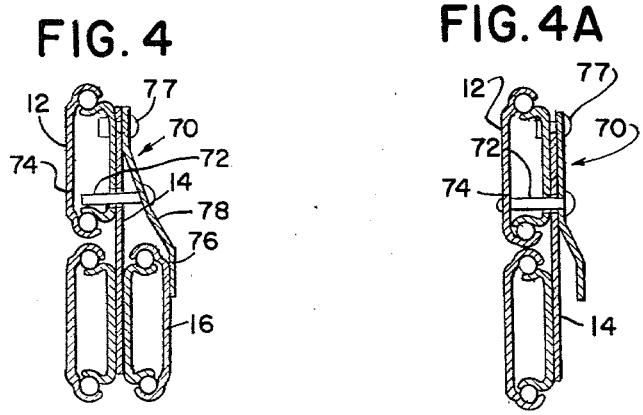

As shown in FIG. 3, when the horizontal track sections are fully extended, extension locks 70 and 80 are engaged. Extension lock 70 is further described with reference to FIGS. 4 and 4A. As track segment 14 is moved to its full right extension, lock pin 72 becomes aligned with hole 74 in track segment 12. The pin enters the hole 74. As cargo container 2 and its fixed track section 16 are moved to the left toward the stored position, track section 16 lifts end 76 of spring device 78, camming pin 72 out of hole 74. In its full right hand position as shown in FIG. 3 and FIG. 4A track segment 16 moves out engagement with the spring device 78 and allows pin 72 to enter hole 74. Camming lug 79 is added to the inward end of track 16 to assist in lifting the spring device 78 upward onto the track 16. As shown in the drawings rivets 77 connect the spring device 78 to middle track section 14.

Figure 5:
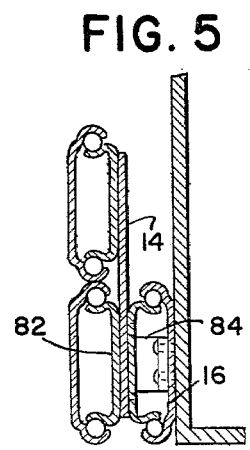
FIG. 5 is a detail of a locking mechanism between second and third horizontal track segments.

As shown in FIGS. 3 and 5 extension lock 80 locks the horizontal track segments 14 and 16 in their extended position by the detent 82 bent at right angles from the leaf spring 84, which is secured to track segments 16 by rivets 86. The detent end 82 fits within opening 88 in the middle track section 14.

Referring to FIGS. 1 and 2, spring plungers 90 may be pulled outward to release vertical track sections 20 and 24 for relative sliding. Spring plungers 90 are constructed similar to the spring plungers 50 as shown in FIG. 1A.

OPERATION

The following is an expanded detailed explanation of the mechanical operational sequences of the car top carrier.

Starting at the position of locked rest with the cargo container on the top of the vehicle, a sequence of motions deploys the cargo container to the waist level load/unload position.

First, the moveable rack is unlocked from its travel position.

Second, one pulls the rack, in a horizontal plane, to the end of the three segment track. This deploys the cargo container to the side of the vehicle at a distance which will permit vertical travel. The cargo container is now displaced far enough to clear the side of the vehicle.

Horizontal motion is accomplished on telescoping track mechanisms of the type as employed in file cabinets. Two embellishments have been added to the state-of-the-art file cabinet-type telescoping track. Automatic mechanical locking devices latch into place as each of the two traveling or telescoping rails reach full extension. When the tracks are fully extended and locked, the cargo container is in the fully deployed horizontal position, clear of the side of the vehicle. The cargo container cannot be moved back toward the center of the vehicle without manually unlocking the rails. This is explained in greater detail with reference to the stowing sequence. Stability has been provided to negate the overturning moment of the mass at the end of the cantilever beam by the use of the traveling brace.

Vertical motion is now affected, while the horizontal motion is constrained by mechanical locks.

A spring-loaded plunger can now be pulled from its lock position. This action cannot be accomplished until the horizontal motion is stopped by locking. Pulling the spring-loaded plunger permits the lowering of the cargo container by gravity action. Controlled descent is accomplished through the use of state-of-the-art type pneumatic/hydraulic cylinders as employed on the hatch door of hatch-back automobiles.

The vertical displacement is accomplished by the use of two or three-segment telescoping tracks of the same type as employed for horizontal deployment. They differ in that they do not have automatic locks at the end of the travel of each segment. This is unnecessary as gravity urges and maintains the cargo container at its lowermost position. Cargo is loaded or unloaded at convenient waist height.

To return to the travel position, the cargo container is raised to its elevated position. The spring-loaded plunger automatically enters the lock detent. The cargo container is now suspended in its uppermost position.

The first action for horizontal deployment to the travel-locked position is to release the spring-loaded lock on the outermost telescoping track segment. The cargo container can then be horizontally urged toward the center of the vehicle, which is the travel-locked position. The cargo container moves on the slideable track until it is fully contained in the second slideable track segment.

Just prior to reaching the limit of its travel, the outermost telescoping track segment automatically cams open the lock on the second or middle telescoping track segment. No action is required by the operator other than urging the cargo container toward travel-locked position.

Continued horizontal movement of the cargo container fully retracts the middle telescoping track segment. When the limit of travel is reached, the spring loaded travel lock engages. The cargo container is now in transport mode.

An electrical interlock between the travel lock and the vehicle engine ignition ensures that the lock must be engaged to permit engine operation. This insures a locked cargo, thereby preventing an unexpected deployment of an unlocked cargo box in a left turn, due to centrifugal action. This safety feature is desireable but not mandatory to the function of this car top carrier.

While the invention has been described with reference to specific embodiments, it will be obvious to those skilled in the art that modifications and variations of the invention may be made without departing from the scope of the invention. The scope of the invention is defined in the following claims.

I claim:

1. A roof top carrier apparatus having a horizontal telescoping track with means to mount the track on a roof of a vehicle, said horizontal track having plural relatively slidable segments, travel lock means mounted on the segments for relatively locking the segments in a telescopically closed position, extension locking means connected to the segments for locking the segments in extended position, and a cargo container mounted on one of the segments for moving from a centered position on a roof of a vehicle in which the travel locking means is locked to an extended position at a side of the vehicle at which extended position extension locking means are locked, said locking means comprising a pin extending through plural openings in first and second of the segments, a spring device, connected to the second of the segments and mounting the pin, whereby the third segment cams the spring device against spring pressure and withdraws the pin from the segment, whereby separation of the third segment from the spring device permits the spring device to move the pin into an opening in the first segment.

2. The cargo container apparatus of claim 1 wherein the travel locking means comprises a travel pin extending through aligned openings in the segments.

3. The cargo container apparatus of claim 2 wherein the travel pin comprises a spring loaded travel plunger having means for urging the plunger into the openings in the segments.

4. The cargo container apparatus of claim 1 wherein the extension lock means comprises a spring clip connected to one segment and an opening in a second of the segments for receiving the spring clip.

5. The cargo container apparatus of claim 1 further comprising a vertical track assembly connected to one of the segments of the horizontal track, the vertical track assembly having plural vertical track segments, a cargo bin connected to one of the vertical track segments and vertical track locking means connected to the vertical track segments for locking the vertical track segments against relative movement in an upward position of the cargo bin.

6. The cargo container apparatus of claim 5 wherein the vertical track locking means comprises a spring loaded plunger mounted on one other vertical track segment for engaging an opening in said one of the vertical track segments.

* * * * *